Oct. 21, 1924.
S. C. WOLFE
WINDSHIELD CLEARER
Filed Dec. 15, 1921
1,512,074
2 Sheets-Sheet 1
Fig. 1
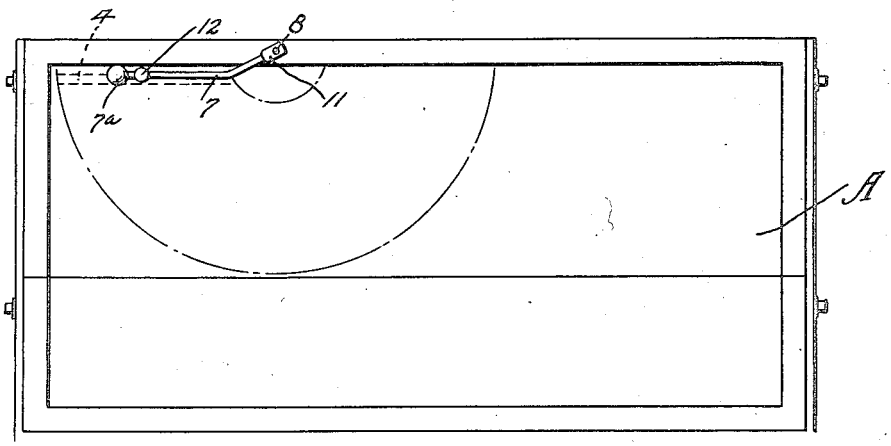
Fig. 2
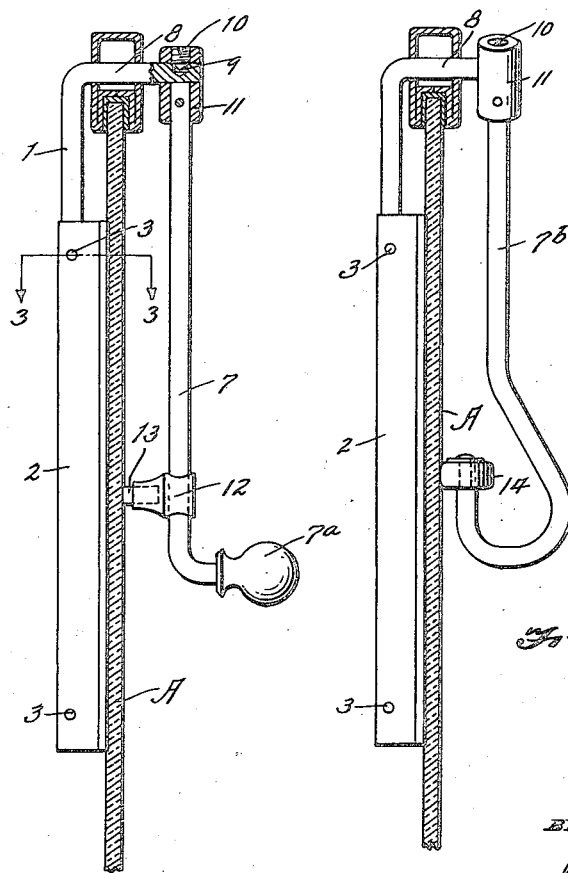
Fig. 3
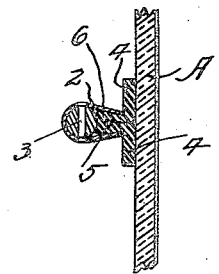
Fig. 4
INVENTOR
S. C. Wolfe
BY
Robt Robt Hill
ATTYS Oct. 21, 1924.
S. C. WOLFE
1,512,074
WINDSHIELD CLEARER
Filed Dec. 15, 1921
2 Sheets-Sheet 2
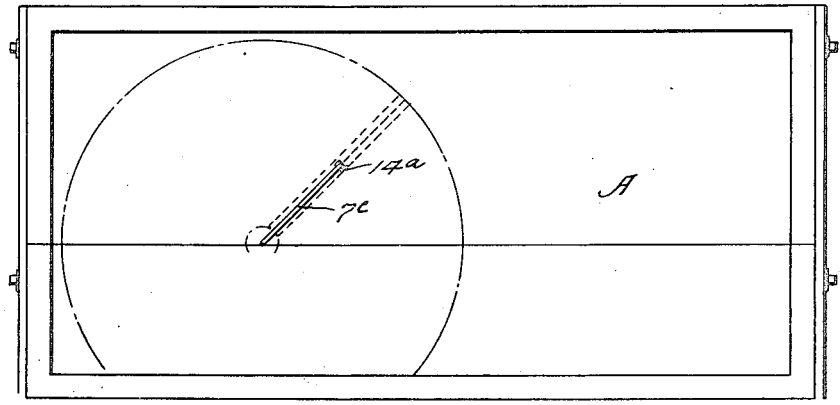
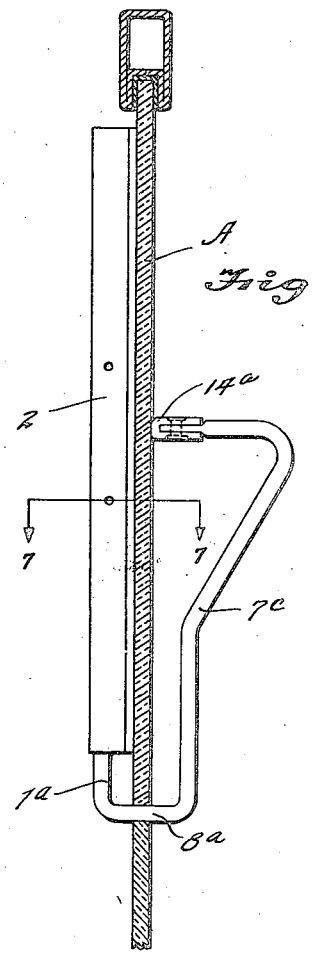
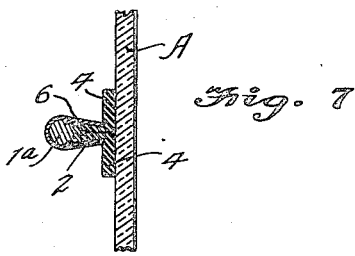
INVENTOR
S.C. Wolfe
BY
Robt Robt Hill
ATT'YS Patented Oct. 21, 1924.

1,512,074

UNITED STATES PATENT OFFICE.

SAMUEL C. WOLFE, OF ANGOLA, INDIANA, ASSIGNOR TO FERNALD MANUFACTURING COMPANY, OF NORTH EAST, PENNSYLVANIA, A CORPORATION.

WINDSHIELD CLEARER.

Application filed December 15, 1921. Serial No. 522,485.

*To all whom it may concern:*

Be it known that I, SAMUEL C. WOLFE, a citizen of the United States, residing at Angola, in the county of Steuben and State of Indiana, have invented certain new and useful Improvements in Windshield Clearers, of which the following is a specification.

This invention has to do with what are generally known as clearing devices for windshields of automobiles, and represents a carrying forward of certain of my patented inventions, found in the prior art, and including that of my Letters Patent No. 1,171,377 of February 8, 1916. I might note that in said patent I utilize wiper members consisting of clearing elements operating at the outer side or front face of the windshield, together with an operating member or handle at the inside of the windshield, manipulated to control the clearing movement of the clearing elements and their pressure against the surface of the windshield. Likewise I employ the fundamental idea of a spring arch connection between the wiping elements and the operating handle, and the additional important idea of using practically a double clearing operation by the clearing elements in the movement of the device.

I am now adhering to the above fundamental features of my invention, with the simplification however, of certain of the construction, together with the employment of a new and fundamental idea of a flat clearing element structure which has an edgewise pushing effect in acting upon moisture, water, snow, or like foreign accumulations upon the windshield interfering with vision therethrough. I find that the utilization of an edgewise pushing clearing element enables me to obtain a superior and more effective clearing action in the operation of my device, and I not only get the edgewise pushing effect, but, practically speaking, I obtain supplementary to that primary effect, a secondary clearing or wiping action by my peculiar form of clearing element, or elements.

I have modified the formation of the arch between my wiping arm and my operating member so that while I still utilize the resiliency of the arch for holding my device in place on the windshield, I am further enabled to effect a slight horizontal movement of the arch member through the windshield in order to obtain the variable pressure effects of the clearing member on the windshield in the clearing action of the former.

I have found that in order to make my device I must utilize a resilient clearing element made up of pure rubber, or a substance having equal resiliency, certain of the composition substitutes now commonly employed in clearing devices not being suitable for the purposes of my invention.

Having regard for the foregoing main features of my invention, I might add that there are specific features of construction which I employ, elucidated clearly in the following description and which possess merit and special advantage in this particular art.

I do not wish to be restricted to the particular form of my device, especially in relation to my peculiar edgewise pushing clearing element or elements, for it will be understood later that this part of my construction, and other details may be considerably modified without departing from the spirit of my invention.

In the accompanying drawings:

Figure 1 is a sort of outline view looking toward the rear side of a windshield of conventional form, and having my invention applied thereto in one of its preferred forms.

Figure 2 is a vertical sectional view showing more clearly the mounting of my device upon the windshield and manner of attaching the handle or operating member to the spindle or arch extension of the clearing member.

Figure 3 is a sectional view on the line 3—3 of Figure 2.

Figure 4 is a view somewhat like Figure 2, but showing a modification.

Figure 5 is a view similar to Figure 1, showing the application of another modified form of my invention to the windshield.

Figure 6 is a sectional view illustrating the type of device of Figure 5.

Figure 7 is a view about on the line 7—7 of Figure 6.

Figure 8 is a sectional view showing how the rubber piece which makes up the clearing element is clamped or engaged by the channel piece and caused to flare at its edges to provide said clearing elements.

Owing to the simplicity of my invention, the same may be very briefly set forth on reference to the drawings. A designates a windshield which may be of any conventional type. On this windshield, according to Figure 1, is mounted my clearer of the form of Figure 2. The clearer comprises a clearing member 1, the body of which is received in a channel piece 2 which may be securely applied thereto by clamping effect, by interconnecting pins 3, or any equivalent means or methods known in the arts. The channel piece 2 receives the folded portion of a piece of rubber, preferably pure Pará rubber, as shown in Figure 3, and is so clamped against said folded portion as to cause its edges which are free of the channel piece to flare apart as shown in Figure 8 at 4. The rubber piece is thus formed to make the clearing elements 4 constituted of the free edges of the rubber piece designated generally 5. To prevent possibility of dislodgment of the clearing elements from the channel piece, a piece of wire preferably brass, as shown at 6, is received in the fold of the part 5 and owing to the clamping action of the channel piece 2 in zones beyond the wire 6, the latter is readily adapted to act for the purpose set forth in conjunction with the fold of the part 5. Obviously the clearing elements 4 must be made of a sufficient thickness to have a pushing effect upon the moisture or other foreign matter lodging on the windshield.

It is fundamental to my invention to utilize the edges of the clearing elements 4 in the manner stated, because I obtain a more effective clearing action thereby than is incident to a mere wiping action such as is commonly employed in most windshield clearers at the present day. In addition to my primary edgewise pushing action of the clearing elements 4, however, I obtain a secondary wiping action of the same owing to the fact that they lie flatwise against the outer surface of the shield when pressed into operative engagement therewith, upon manipulation of the operating arm 7, which is connected with the spindle 8 projecting horizontally from the clearing member 1. The spindle 8 is practically an extension of the rod from which the body of the wiper arm is made, the rear end of the said spindle having a recess in which is receivable a pin 9 projecting from the inner end of a screw 10 which is threaded into a socket piece 11 receiving the spindle aforesaid, as evident from Figure 2 of the drawings. The socket member 11 is carried by the upper end of the operating arm or handle 7, the latter being equipped with a knob 7ª to facilitate its manipulation. Also, the member 7 has a socket piece 12 having a contact element 13 thereon to engage the inner surface of the windshield to hold the clearer in position when not in use and to maintain it properly in operative relation to the windshield when said clearer is in use.

I may substitute for the contact member 13, which is of composition or leather or the like, a roller 14 as shown in Figure 4, said roller being carried by the lower portion of the member 7ᵇ which is shaped to provide a part adapted to be readily grasped for manipulation of the device.

In the constructions thus far described, the spindle 8 of the clearer has a substantially horizontal disposition, and the material from which it is made is resilient so that, as is the case with my device of my patent previously identified, by varying the pull on the member 7 inwards, the pressure of the clearing elements 4 acting on the outer surface of the windshield may be correspondingly varied.

Referring now to Figures 5 and 6 my clearer is designed to be supported between the sections of the windshield A as distinguished from that previously described in which the spindle 8 passes through an opening in the top of the windshield. In this modification of Figures 5 to 7 inclusive, the wiping arm member 1ª, the spindle 8ª and the operating arm 7ᶜ are substantially a continuous length of material, such as a rod bent to suitable shape. The contact member 14ª is a leather or composition piece riveted to the end of the member 7ᶜ in an obvious manner. The principles of operation of this device are practically identical with that previously described. In other words, in both of my general types of construction the spindle 8ª acts as a sort of a pivotal axis as the operating arm 7, 7ᵇ, or 7ᶜ, as the case may be, is actuated to produce the proper operation of the clearing elements. The clearing means operates in a circular zone of contact with the windshield and in the form of my device of Figures 1 to 4, I bend the body portions of the members 1 and 7 a short distance from the spindle 8 to enable these portions to lie in a plane substantially parallel with the top rail of the windshield A when the clearing device is not being used.

In my construction the clearing elements 4 do not have the flapping wiping action which is incident to the use of the majority of windshield clearers at present employed. Such action is one that necessitates a loose mounting of the windshield clearer upon the windshield because under operating conditions it is necessary for opposite sides of the clearing elements to act on the windshield surface, something of course not resorted to by me in my present or past devices. I procure with my device an edgewise pushing of the foreign substance from the windshield with practically a double wiping supplemental clearing action by the spaced flat portions of may clearing elements, the latter acting successively to the edgewise pushing action in an evident manner. This is true in respect to either direction of movement of my device. It is notable also that owing to the fact that my clearing elements extend in opposite directions, and the contact members 13, 14, or 14ª, as the case may be, act on the windshield opposite a line or point intermediate the clearing elements, the device is stabilized upon the windshield, especially in respect to the construction in Figure 6 which is mounted so as to pivot in a recess filed or otherwise formed in the lower edge of the upper glass section of the shield.

Having thus described my invention, what I claim as new and desire to secure by Letters Patent is:

1. A windshield clearer comprising a wiping arm provided with a spindle and adapted to be disposed upon one side of a windshield glass, an operating arm disposed on the opposite side of the windshield glass and connected to the spindle, the said parts having an inherent resiliency which tends to hold them in operative relation to the windshield glass, a flexible wiping sheet folded upon itself with the folded portions thereof in direct engagement with each other, and clamping means upon the wiping arm having a gripping edge compressing portions of the wiping sheet to project the free edges thereof laterally in opposite directions to fit flat against the windshield glass with the edges thereof exposed and facing in opposite directions.

2. A windshield clearer comprising a wiping arm, a clamping member thereon, and a flexible wiping sheet folded upon itself and having the body thereof adjacent the free edge portions compressed between the sides of the clamping member with such portions extending beyond the clamping member and projected laterally in opposite directions by the compression of the sheet at the gripping edge of the clamping member.

3. A windshield clearer comprising a wiping arm, a channel member receiving the wiping arm in the folded portion thereof, a flexible rubber wiping sheet folded upon itself and having the folded portion thereof squeezed between the sides of the channel member, and a locking strip in the loop of the folded portion of the rubber sheet, the free edge portions of the rubber sheet extending beyond the channel member and the squeezing of the rubber sheet between the channel member causing the free edges of the rubber sheet to diverge from each other.

In testimony whereof I affix my signature.

SAMUEL C. WOLFE.